July 24, 1956     W. A. RINGLER     2,755,962
COLLAPSIBLE BOTTLE CARRIERS
Filed Jan. 8, 1952     6 Sheets-Sheet 1
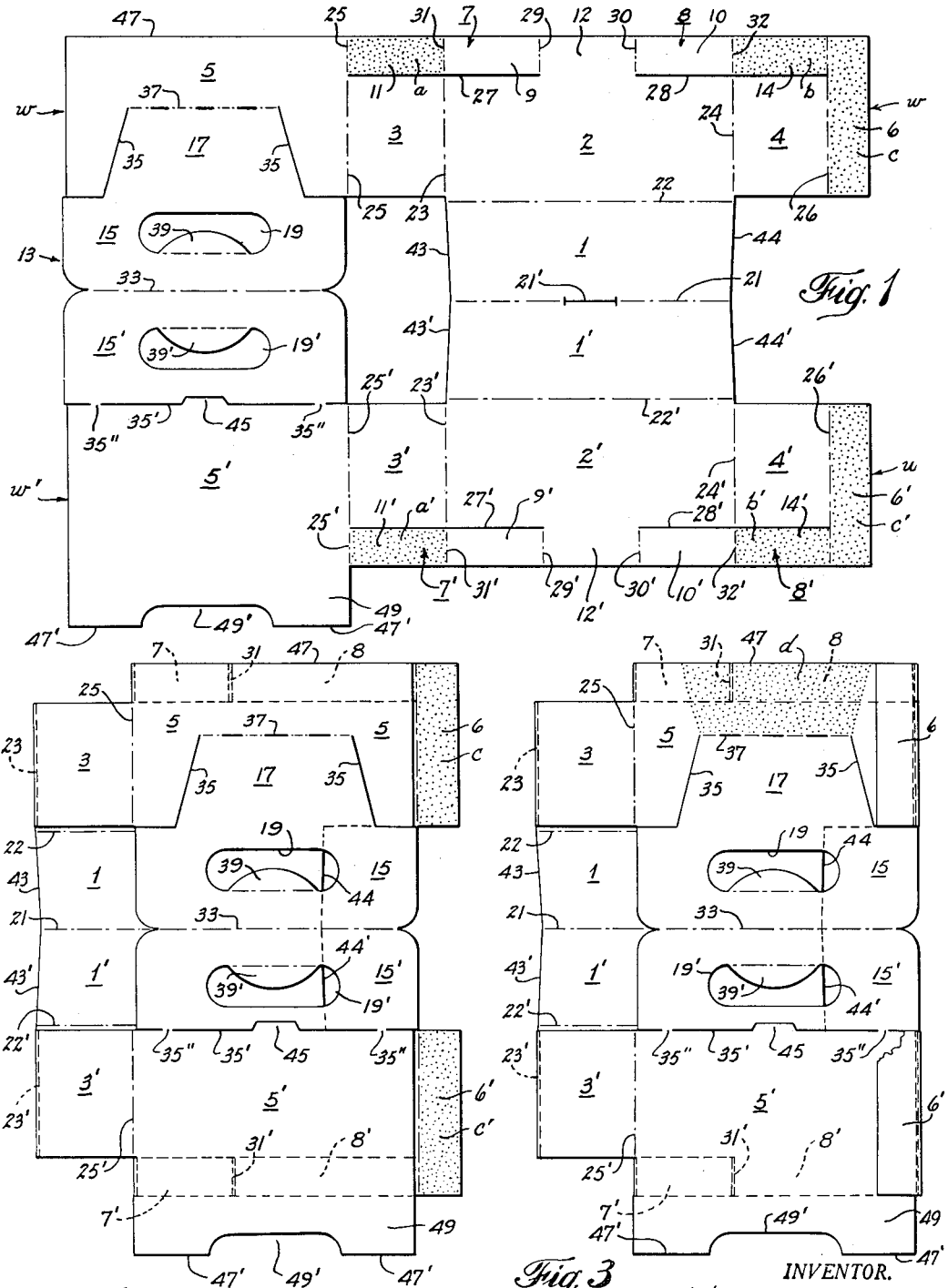
INVENTOR.
WILLIAM A. RINGLER
BY
ATTORNEY.

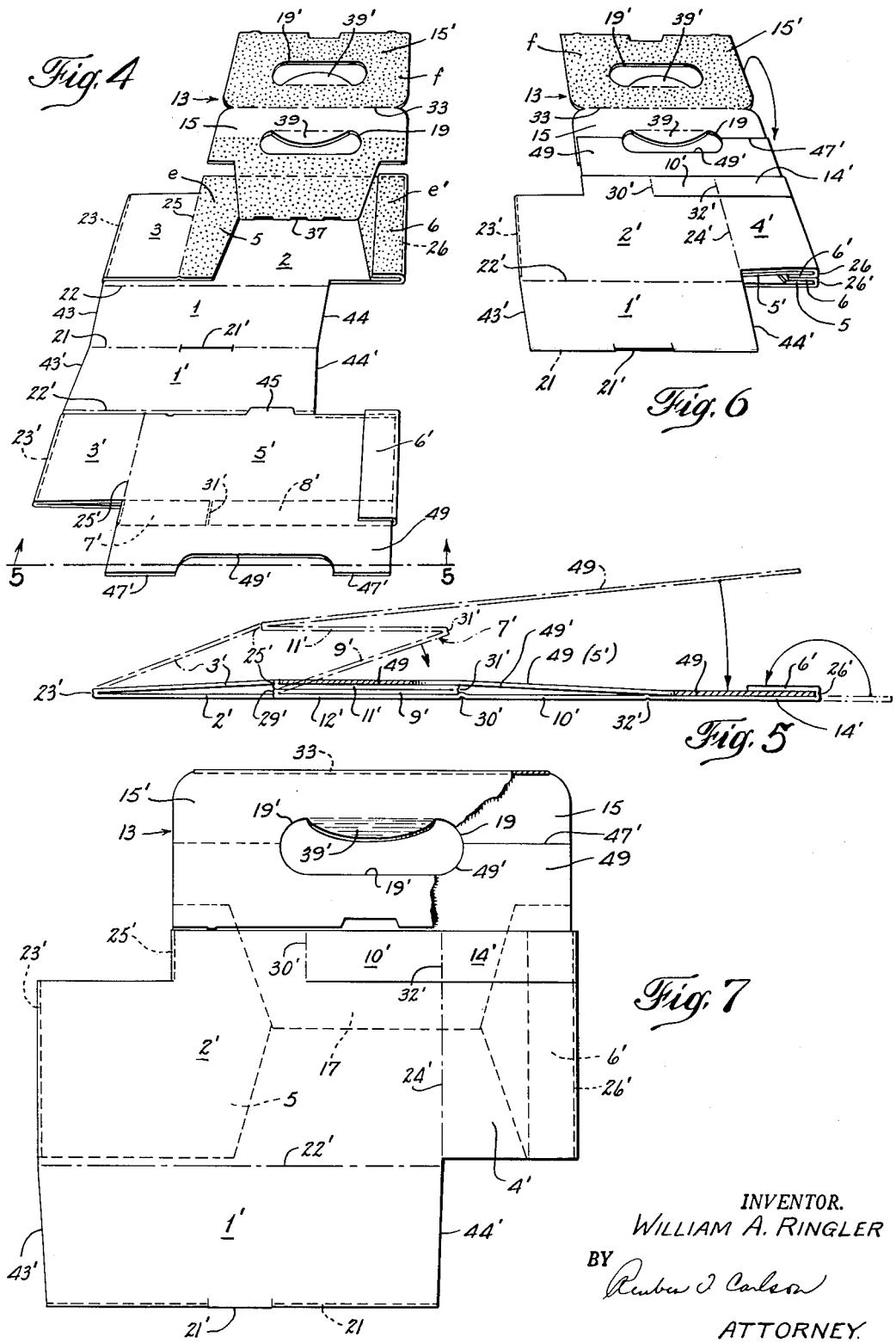

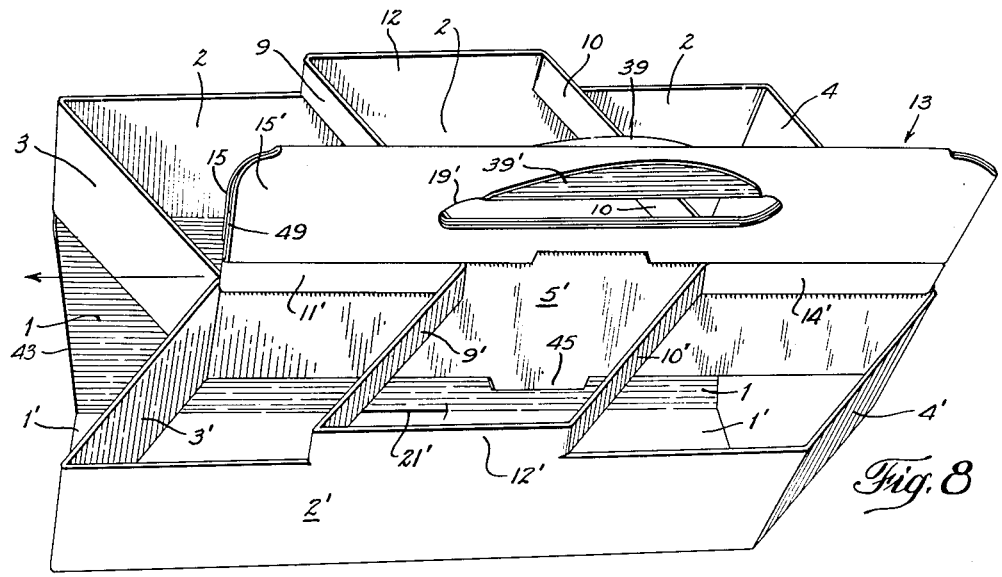
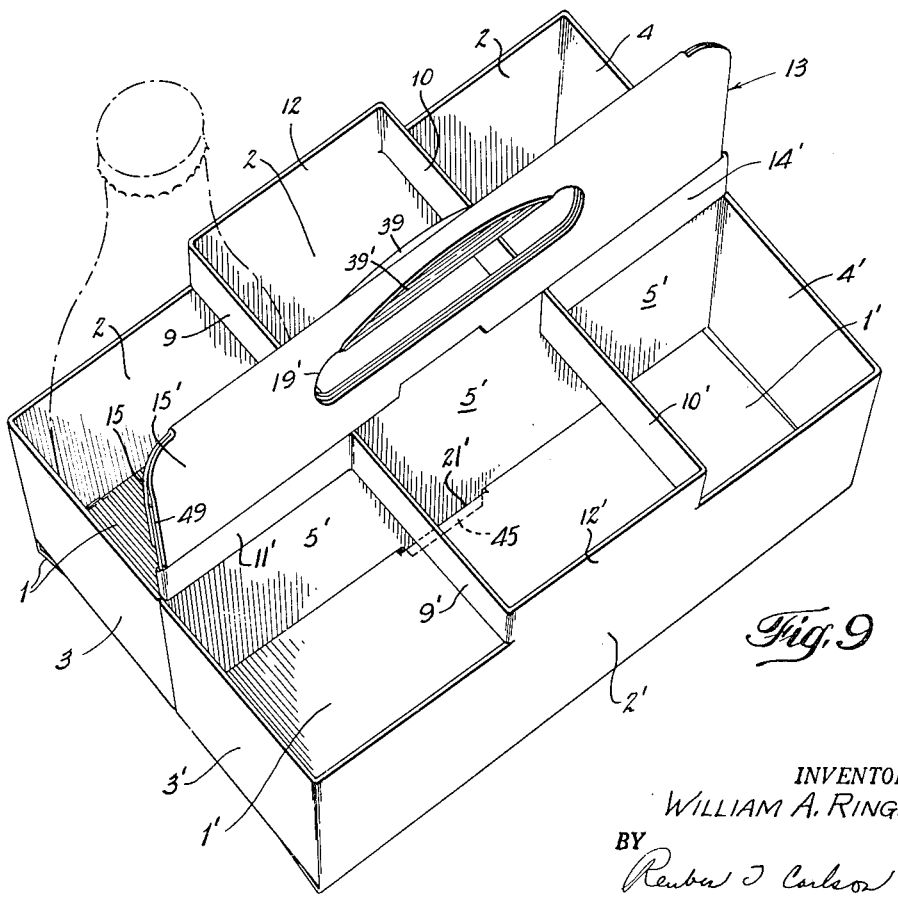

July 24, 1956 — W. A. RINGLER — 2,755,962
COLLAPSIBLE BOTTLE CARRIERS
Filed Jan. 8, 1952 — 6 Sheets-Sheet 4

INVENTOR.
WILLIAM A. RINGLER
BY
ATTORNEY.

July 24, 1956 W. A. RINGLER 2,755,962
COLLAPSIBLE BOTTLE CARRIERS
Filed Jan. 8, 1952 6 Sheets-Sheet 5
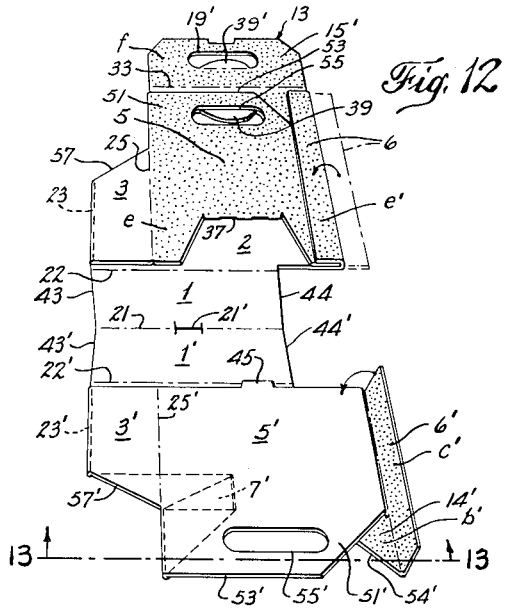
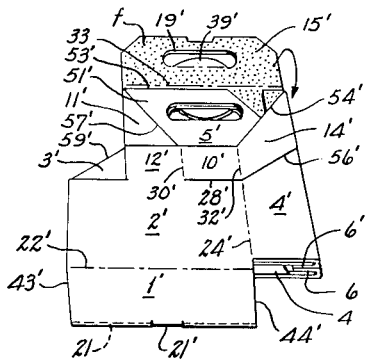
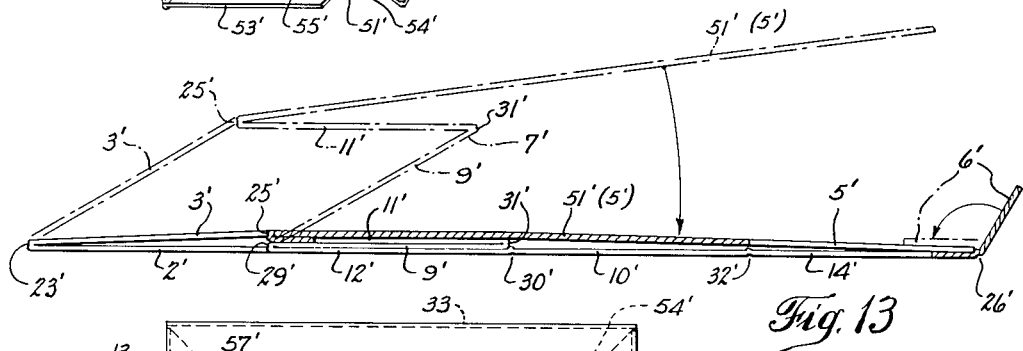
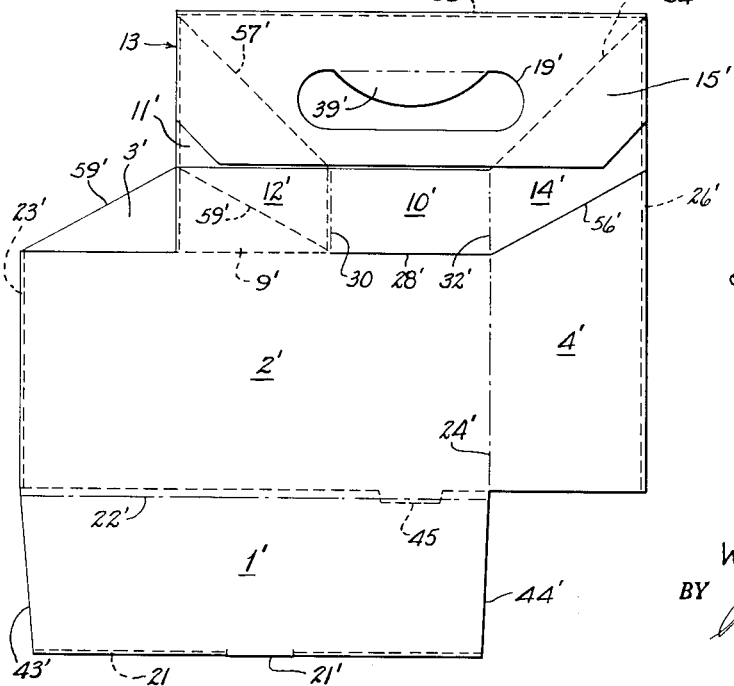
INVENTOR.
WILLIAM A. RINGLER
BY
Reuben O. Carlson
ATTORNEY July 24, 1956 W. A. RINGLER 2,755,962
COLLAPSIBLE BOTTLE CARRIERS
Filed Jan. 8, 1952 6 Sheets-Sheet 6
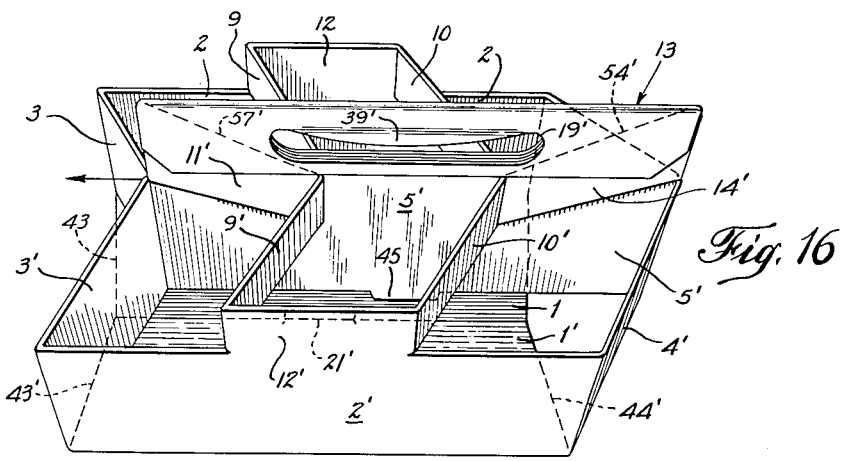
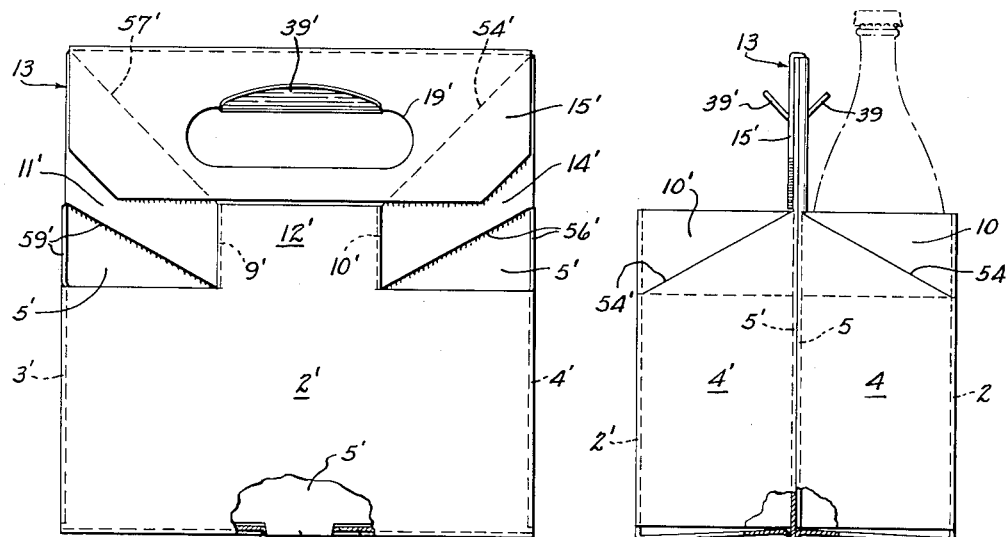
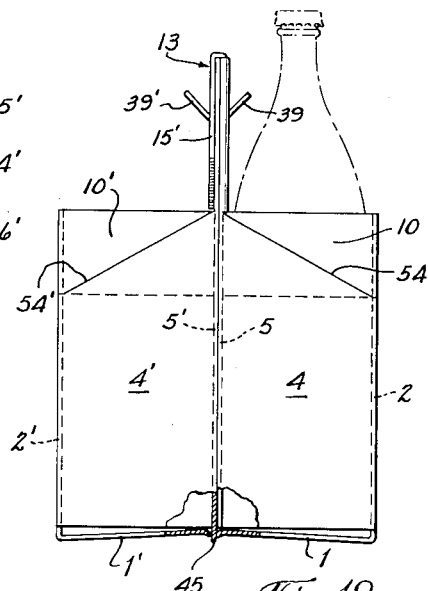
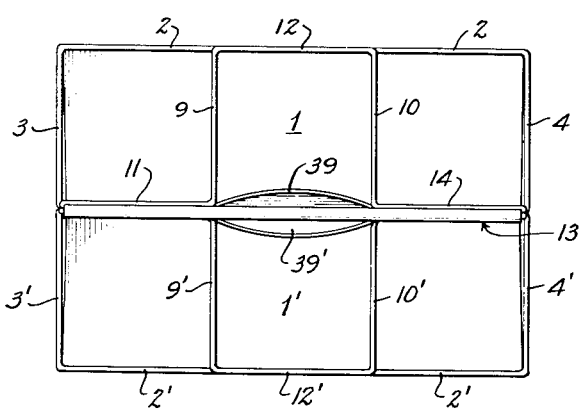
INVENTOR.
WILLIAM A. RINGLER
BY
ATTORNEY.

United States Patent Office 2,755,962
Patented July 24, 1956

2,755,962

COLLAPSIBLE BOTTLE CARRIERS

William A. Ringler, Wayne, Pa., assignor to The Gardner Board & Carton Co., Middletown, Ohio, a corporation of Ohio Application January 8, 1952, Serial No. 265,423

12 Claims. (Cl. 220—113)

This invention relates to collapsible bottle carriers, and more particularly to twin compartmented multicelled bottle carriers formed from paperboard or fiberboard materials which are designed to permit flat collapse thereof during shipment and storage and convenient erection for bottle filling and transportation.

The large and increasing consumer demand for bottled soft drinks, beer and other bottled beverages, has made it desirable and necessary for the beverage bottling and distributing industry to furnish with their respective beverage products attractive bottle holders or carriers by means of which the consumer may conveniently transport and receive delivery of a plurality of beverage filled bottles and conveniently return the empty bottles to the beverage bottler or distributor. In order to effectively and economically pack the beverage bottles in bottle carriers, distribute the bottle filled carriers to the retailer or consumer, and remove the empty bottles from the returned carriers, beverage bottlers and distributors have found it increasingly desirable to install systematized handling equipment for filling the carriers, for placing the carriers in the low walled distributor cases as commonly used, for handling, stacking and transporting the carrier filled distribution cases, and for removal of the empty bottles from the returned carriers so that they may be expeditiously washed and cleansed before reuse. These factors have imposed exacting requirements with respect to the form and construction of bottle carriers which are not met by many of the bottle carriers as heretofore made and used.

Bottle carriers made in accordance with this invention are designed to satisfy the exacting requirements of the beverage bottling and distribution industry. These carriers are also designed and constructed to permit low-cost manufacture and assembly thereof, to provide carriers which are durable and lasting in use, convenient and attractive for consumer handling, rigid and sturdy when erected, provide cushioned protection and retainment of the bottles inserted therein, and additionally present substantial flat surface areas for the reception of attractive advertising decoration, with the bottles therein adequately displayed.

In erected form, these improved bottle carriers present flat side and end wall panels which extend when erected from the flat bottom panel to any desired height. A composite multi-ply center partition is centrally spaced between the side panels. Each end panel comprises a pair of end panel sections foldably connected to the vertical side edges of the adjacent side panels and center partition. Cross partition forming straps extend between and are foldably connected to each side panels and the center partition to provide bottle retaining cells for each of the two carrier compartments. A multi-ply handle part is adhesively secured to the composite center partition and is provided with a convenient hand hole. The bottom panel is longitudinally scored in alignment with the center partition to define similar paired bottom sections which permit flat collapse of the carrier. As thus constructed, these carriers are rigid and sturdy when erected, unyielding to bottle load strain, and are convenient to collapse and erect.

Additionally, these improved bottle carriers are designed to present the top horizontal edges of the handle sections below the top ends of the bottles packaged therein so that the bottle filled carriers may be stacked to rest on the tops of the bottles, and with the end edges of the bottom panel contained within its associated end panel sections so that any selected carrier may be removed from the distributor case without interference from the adjacent carriers packed therein.

These carriers are additionally designed to permit their formation from one-piece blanks which can be scored and cut from stock sheets of selected paperboard or fiberboard material previously finished, imprinted and decorated on one side thereof only, with very little waste of stock sheet material. These carrier blanks are also particularly designed to permit high speed gluing and folding thereof into completed bottle carriers in collapsed form suitable for storage and shipment, in a single pass through a substantially standard folding and gluing machine. As a result, these high quality, durable and attractive bottle carriers can be manufactured at relatively low cost.

Other objects and advantages of this invention will become apparent as the disclosure proceeds.

Although the characteristic features of this invention will be particularly pointed out in the claims appended hereto, the invention itself, and the manner in which it may be carried out, may be better understood by referring to the following description taken in connection with the accompanying drawings forming a part hereof, in which—

Fig. 1 is an inside face view of the blank as cut and scored from a paperboard or fiberboard stock sheet for assembly into the bottle carrier, this view also showing adhesive applied to certain areas thereof preliminary to the initial folding operation;

Fig. 2 is an inside face view of the blank shown in Fig. 1 after the initial folding operation has been completed;

Fig. 3 is an inside face view of the blank shown in Fig. 2 as the same would appear when the second folding operation has been completed, this view showing adhesive applied to further areas of the blank in preparation for the third folding operation;

Fig. 4 is an inside face view of the blank shown in Fig. 3 as it would appear after the third folding operation has been executed, this view also showing adhesive applied to still further areas of the blank preparatory to performance of the fourth folding operation;

Fig. 5 is an enlarged horizontal cross sectional view of the partially folded blank as it would appear when viewed along line 5—5 of Fig. 4, this view also showing in dot and dash lines the appearance of the blank undergoing the first folding stage of Fig. 2;

Fig. 6 is a perspective view of the collapsed carrier as viewed from the bottom end thereof after the fourth folding operation has been performed on the blank shown in Fig. 4;

Fig. 7 is a plan view of the fully assembled carrier as it would appear in collapsed form after the gluing and folding operations above described have been performed on the blank shown in Fig. 1;

Fig. 8 is a perspective view of the assembled carrier as the same would appear when undergoing erection expansion from its collapsed form shown in Fig. 7;

Fig. 9 is a perspective view of the fully erected carrier as formed from the blank shown in Fig. 1;

Fig. 12 is an inside face view of the blank shown in Fig. 11 as the same would appear when the second folding operation has been performed thereon, this view showing adhesive applied to additional areas thereof in preparation for the third folding operation;

Fig. 13 is a horizontal cross sectional view of the partially folded blank as viewed along line 13—13 of Fig. 12, this view also showing in dot and dash lines the appearance of the blank when undergoing the second folding stage of Fig. 12;

Fig. 14 is a perspective of the blank shown in Fig. 12 after the third folding operation has been performed thereon and as viewed from the carrier forming bottom end thereof, this view also showing adhesive applied to still further areas of the blank in preparation for the following final folding operation;

Fig. 15 is a plan view of the completed carrier in collapsed form as it would appear after the fourth folding operation has been performed on the blank shown in Fig. 14;

Fig. 16 is a perspective view of the assembled carrier as the same would appear when undergoing erection expansion from its collapsed form shown in Fig. 15;

Fig. 17 is a side elevational view of the fully erected carrier formed from the blank shown in Fig. 10;

Fig. 18 is an end elevational view of the erected carrier; and

Fig. 19 is a top view of the erected carrier.

Similar reference characters refer to similar parts throughout the several views of the drawings and specifications.

Figures 10, 11:
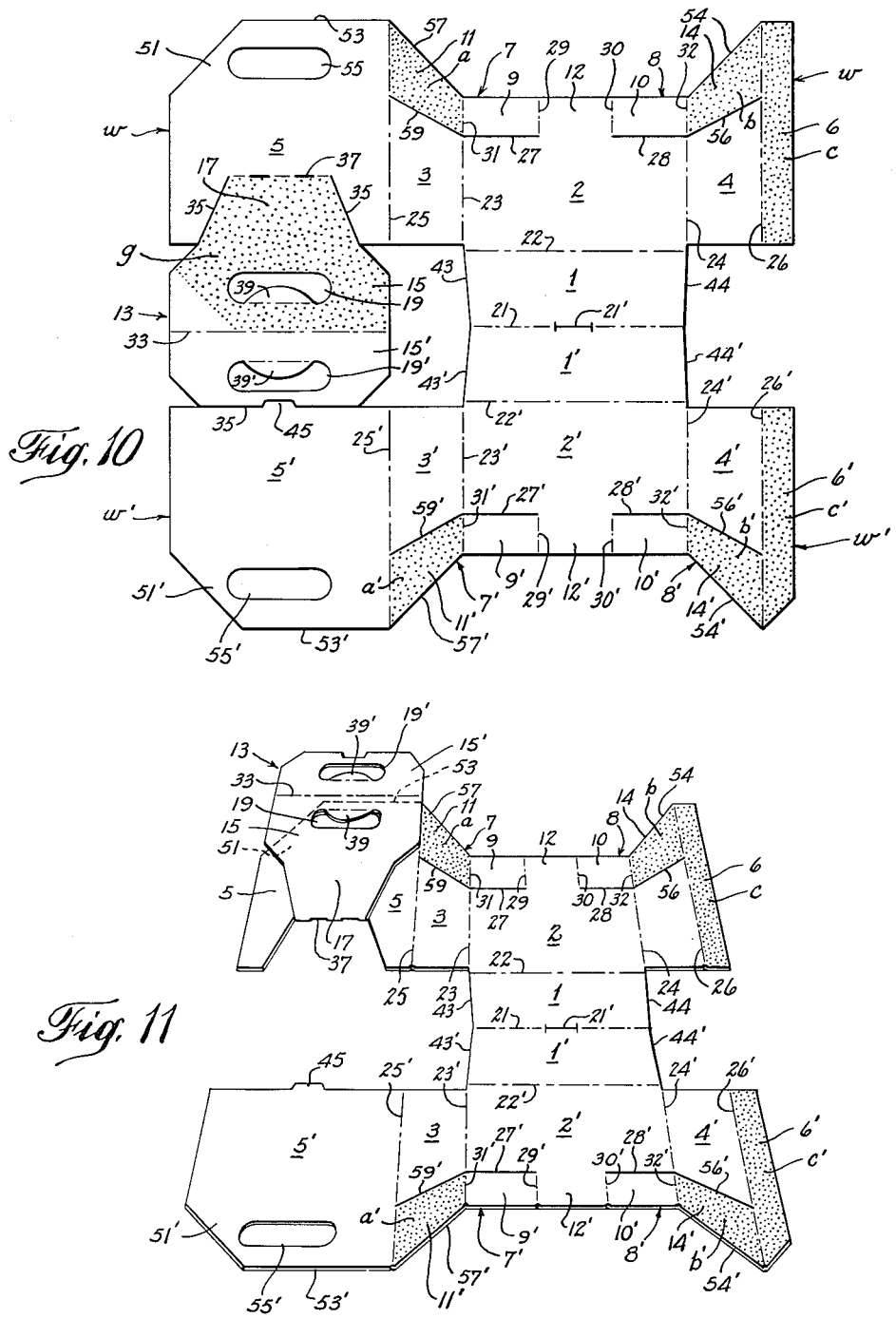
Fig. 10 is an inside face view of a modified form of blank as cut and scored from a paperboard or fiberboard stock sheet for assembly into the modified form of carrier shown in Figs. 16 to 19 inclusive, this view also showing adhesive applied to certain areas thereof preliminary to the initial folding operation.
Fig. 11 is an inside face view of the blank shown in Fig. 10 after the initial folding operation has been performed thereon.

The improved bottle carriers of this invention may be advantageously made from paperboard or fiberboard blanks of generally H-shaped form as indicated in Figs. 1 and 10. In their manufacture, large size paperboard or fiberboard stock sheets of selected quality are printed and decorated on one side thereof only, and the carrier forming blanks may then be scored and cut therefrom in a single pass through a cutting and scoring machine, adjusted to perform the requisite cutting and scoring operations. The carrier forming blanks are shaped and designed to yield very little waste of stock sheet material, and to permit high speed gluing and folding of the carrier forming blanks in a single pass through an automatic gluing and folding machine of substantially standard construction. As a result, high speed and low cost production of bottle carriers may be attained. The bottle carriers made and produced in accordance with this invention are sturdy and strong in construction, durable in use, and adequately satisfy the exacting requirements of the beverage bottling and distributing industry.

These improved bottle carriers, made from the blanks as shown in Figs. 1 and 10, are cut and scored to provide a bottom panel particularly designed to support two rows of bottles with three bottles in each row. The bottom panel comprises bottom half sections 1 and 1' of similar size, hingedly connected along a longitudinally-extending collapsing score 21. Side panels 2 and 2' are hingedly connected to the opposite side edges of bottom sections 1 and 1' along parallel extending scores 22 and 22' which are also parallel to the bottom collapsing score 21. Wings w and w' may be made to extend from both side edges of the side panel 2 and 2' respectively as shown in Figs. 1 and 10 to form a bottle carrier blank which is generally H-shaped in configuration.

The left hand wings of the blanks as shown in Figs 1 and 10 are scored to form a pair of end wall panel sections 3 and 3' foldably connected along score lines 23 and 23' to the adjacent side edges of the side panel 2 and 2' respectively. A pair of center partition sections 5 and 5' are foldably connected along score lines 25 and 25' to the respective end panels 3 and 3'. A pair of strap forming parts 7 and 7' are separated from the side panels 2 and 2' and the adjacent end panel sections 3 and 3' by a pair of longitudinally extending cuts 27 and 27'. The strap forming parts 7 and 7' as shown in Figs. 1 and 10 are foldably connected at one end thereof by transverse scores 29 and 29' to a medial extension 12 and 12' of the side panels 2 and 2'. The other end of the strap parts 7 and 7' are foldably connected to the upper part of the adjacent center partition sections 5 and 5' along their respective side edge defining scores 25 and 25'. The strap forming part 7 and 7' are also transversed by medial scores 31 and 31' which are substantially in alignment with the transverse scores 23 and 23' as the blanks shown in Figs. 1 and 10 are formed. The mid-sectional scores 31 and 31' thus divide the strap forming parts 7 and 7' into two foldable sections comprising strap forming sections 9 and 9' and spanner sections 11 and 11'.

The wing extensions w and w' at the right hand side of the blank shown in Figs. 1 and 10, are also scored to form a pair of end panel sections 4 and 4' foldably connected along score lines 24 and 24' to the adjacent side edges of the respective side panels 2 and 2'. A pair of flap sections 6 and 6' are foldably connected along score lines 26 and 26' to the respective end panel sections 4 and 4'. A pair of strap forming parts 8 and 8' are separated from the side panels 2 and 2' and the adjacent end panel sections 4 and 4' by a pair of longitudinally extending cuts 28 and 28' as shown in Figs. 1 and 10. Strap forming parts 8 and 8' are also foldably connected at one end thereof by transverse scores 30 and 30' to the medial extensions 12 and 12' of the side panels 2 and 2'. The other end of the strap parts 8 and 8' are foldably connected to the upper part of the adjacent flap sections 6 and 6' along their respective side edge defining scores 26 and 26'. The strap forming parts 8 and 8' are also transversed by medial scores 32 and 32' which are substantially in alignment with the transverse scores 24 and 24' as the blanks shown in Figs. 1 and 10 are formed. The mid-sectional scores 32 and 32' thus divide the strap forming parts 8 and 8' into two foldable sections comprising a strap forming sections 10 and 10' and spanner sections 14 and 14'.

Material for the multi-ply handle part 13 is captured from that portion of the sheet material residing between the left hand wing extensions w and w' of the blanks shown in Figs. 1 and 10. The multi-ply handle part comprises handle forming sections 15 and 15' foldably connected along a longitudinal score 33 which, in the blank forms shown in Figs. 1 and 10, may be substantially in alignment with the medial score 21 which defines the bottom panel sections 1 and 1'. The handle forming part 15' is separated from the bottom forming end of the center partition 5' by a cut 35'. The handle forming section 15 presents a lower extension 17 which is taken from material at the lower half of the center partition section 5 and defined by the vertically inclined cuts 35, the bottom forming end of the handle section 15 being otherwise hingedly connected to the center partition section 5 along a longitudinal score 37. Each of the handle forming sections 15 and 15' are provided with hand hole cutouts 19 and 19'. Edge rounding flaps 39 and 39' may be associated with the hand holes 19 and 19', captured from material otherwise discarded in the formation thereof.

In the blanks shown in Figs. 1 and 10, the end edges 43 and 44 of the bottom half section 1 and the end edges 43' and 44' of the bottom half section 1' have a slight taper inwardly towards the collapsing score 21 so that the ends of the bottom panel will be contained within the adjacent end panel sections 3 and 3', 4 and 4' when the assembled carrier is filled with bottles and placed in the distributor case. To contain the carrier in erected form, a foot lug 45 may be formed as a part of the center partition section 5' to project downwardly from the bottom forming edge thereof, and designed to be inserted through a receiving slit 21' formed in the appropriate location mid-sectionally of the bottom panel collapsing score 21.

As the blanks shown in Figs. 1 and 10 are thus cut and scored, the wing extensions w and w' are designed when glued and folded to provide a twin compartment bottle carrier with a pair of end cells at both ends thereof. The end panels sections 3 and 3', the center partition sections 5 and 5' and the cross strap sections 9 and 9' form a pair of enclosed end cells at one end of the carrier, and the end panel sections 4 and 4', the center flap sections 6 and 6' and associated center partition sections 5 and 5' to which they are glued, along with the cross strap sections 10 and 10', form the other pair of end cells at the other end of the carrier. Additionally, the spaced cross partition straps 9 and 10 define an intermediate bottle receiving cell in one half section, and the spaced cross partition straps 9' and 10' together define an intermediate cell in the other half section of the assembled and erected carrier. The intermediate cells as thus formed are separated medially of the carrier by the paired center partition sections 5 and 5'.

As assembled and erected, the upper portions of the center partition sections 5 and 5' extend above the top edges of the adjacent end panel sections 3 and 3', 4 and 4', and when the handle forming flap 13 is folded along its longitudinal score 37, the handle forming section 15 will overlie the outside face of the center partition section 5, and when further folded along the score 33, the handle section 15' will overlie the center partition section 5'.

The carrier forming blanks in the form shown in Fig. 1 may be made substantially rectangular in outline, with the top edge 47 of the center partition section 5 substantially in alignment with the top edge of the strap forming parts 7 and 8 and the top edge of the medial extension 12 of the adjacent side panel 2. The center partition section 5' may, as selectively desired, be made somewhat higher than the center partition section 5 to provide a handle forming extension 49, with its top edge 47' extending slightly beyond the top edges of the strap forming parts 7' and 8' and the top edge of the medial extension 12' of the adjacent side panels 2', thereby stiffening and strengthening the composite handle forming part. A handle forming notch cutout 49' may be formed in the upper edge 47' of the center partition section 5', which is located to align with the hand holes 19 and 19' associated with the handle forming flap 13 when the carrier is assembled. The cut line 35' may be interrupted by a pair of narrow breakable portions or necks 35" so that the handle forming flap 13 remains connected to the bottom forming edge of the center partition section 5' during the initial folding stages shown in Figs. 2 and 3.

To assemble the carrier from the blank shown in Fig. 1, areas of adhesive a and a' are first applied to the inside faces of the spanner sections 11 and 11', with similar areas of adhesive b and b' also applied to the spanner sections 14 and 14' as shown in Fig. 1. Areas of adhesive c and c' are also applied to the inside faces of the center flap sections 6 and 6'. As the blank moves through the gluing and folding machine, the left hand wing extensions of the blank shown in Fig. 1 are folded along the aligned scores 23 and 23' so as to place the end panel sections 3 and 3' in overlying relation to the adjacent side panels 2 and 2', and to place the center partition sections 5 and 5' in overlying relation to the inside faces of the adjacent side panels 2 and 2' and the inside faces of the adjacent end panel section 4 and 4', as shown in Figs. 2 and 5.

The gluing and folding machine is provided with buckling devices operating in conjunction with the above described folding movement of the end panel sections 3 and 3', to fold the strap sections 9 and 9' along the transverse scores 29 and 29' into overlying relation to the adjacent medial extensions 12 and 12' of the side panels, and to fold the associated spanner sections 11 and 11' outwardly along the transverse scores 31 and 31' into overlying relation to the associated infolded strap sections 9 and 9', as shown in dot and dash lines in Fig. 5. When this folding operation has been completed as shown in Fig. 2 and in full lines in Fig. 5, the spanner sections 11 and 11' will have become adhesively secured to the adjacent side edges of the center partition sections 5 and 5' respectively, and the opposite side edges of the center partition sections 5 and 5' will have become adhesively secured to the spanner sections 14 and 14' associated with the right hand wings w and w' of the blank. With this folding operation, it will also be noted that the handle forming flap 13 is folded over the inside face of the bottom panel sections 1 and 1'.

In an associated folding operation performed at the right hand side of the blank, the center flap section 6 is folded over and adhesively secured to the adjacent side edge of the folded center partition section 5, and the center flap section 6' is folded over and adhesively secured to the adjacent side edge of the center partition section 5' as shown in Figs. 3, 4 and 5. An area of adhesive d is applied to the folded center partition section 5 which conforms in area to the lower extension 17 of the handle section 15, and which extends from the longitudinal score 37 to the top edge 47 thereof as shown in Fig. 3.

In the next folding operation, the breakable necks 35" which connect the otherwise separated handle forming section 15' to the bottom forming edge of the center partition section 5' as shown in Fig. 3, are broken, and the handle forming flap 13 is folded along the longitudinal score 37 so that the lower extension 17 thereof will overlie and become adhesively secured to the glued face of the center partition section 5 as shown in Fig. 4. Adhesive is then pulled to the left hand side area e of the center partition section 5, to the right hand side area e' of the center partition section 5 and overfolded center flap section 6, to the face of the folded lower extension 17, and to a part of the handle section 15 conforming to the handle forming extension 49 of the center partition section 5', no adhesive being applied to the underlying side panel 2. An area of adhesive f is also applied to the face of the extended handle forming section 15' as shown in Fig. 4.

In the following folding operation, the bottom panel is folded along its medial score 21 so as to place the bottom panel section 1' in overlying relation to the bottom panel section 1, to place the end panel section 3' in overlying but in unglued relation to the end panel section 3, to place the inturned center flap section 6' in overlying and in glued relation to the inturned center flap section 6, and to place the center partition section 5' in overlying and in glued relation to the side edges of the center partition section 5, to the folded handle extension 17, and to the lower half portion of the handle forming section 15. When the blank as shown in Fig. 4 has thus been folded, it will appear as shown in Fig. 6.

As the final folding operation, the handle forming section 15' is folded along the longitudinal score 33 to overlie and become adhesively secured to the upper portion of the handle forming section 15 and the upper handle forming extension 49 of the center partition section 5'. When the blank shown in Fig. 6 has thus been folded, the carrier formed from the blank shown in Fig. 1 will have been fully assembled in collapsed form for shipment and storage as shown in Fig. 7.

To erect the fully assembled but collapsed carrier as shown in Fig. 7, the bottom panel at the collapsing score 21 is placed on a flat surface and downward pressure exerted thereon, thereby causing the carrier to become partially expanded into the form shown at Fig. 8. Complete expansion and erection of the carrier may then be accomplished by shifting the handle part 13 and associated center partition sections 5 and 5' to the left as shown in Fig. 8, providing a fully erected carrier in form to receive the bottles as shown in Fig. 9. To maintain the carrier in the fully erected position during bottle filling as shown in Fig. 9, the foot lug 45 associated with the bottom edge of the center partition section 5' may be inserted through the cut 21' formed centrally in the medial score 21 in the bottom panel.

The assembled carrier as shown in Figs. 17, 18, and 19 as formed from the blank shown in Fig. 10, is similar in general construction to the erected carrier shown in Fig. 9 and differs therefrom mainly in the shape formation of certain parts thereof. In the carrier forming blank shown in Fig. 11, both of the center partition sections 5 and 5' are provided with handle forming extensions 51 and 51' to thereby add two thicknesses to the composite handle forming part, and thus making the composite handle forming part of the carrier as completed of four-ply thickness. As thus constructed, the top edges 53 and 53' of the handle forming extensions 51 and 51' extend above the top edges of the medial extensions 12 and 12' of the side panels 2 and 2'. The handle forming extensions 51 and 51' are provided with hand hole cutouts 55 and 55' located to align with one another and with the hand holes 19 and 19' of the handle forming flap 13 when the carrier is fully assembled.

As shown in Fig. 10, the spanner sections 11 and 11' may also be provided with inclined top edges 57 and 57' and the lower edge thereof may also be cut on a corresponding incine to provide inclined top edges 59 and 59' for the end panel sections 3 and 3'. Similarly, the center flap sections 6 and 6' may be made substantially in the same height as the center partition sections 5 and 5' and their associated handle forming extensions 51 and 51', as shown in Fig. 10. In this blank form, the top edges 54 and 54' of the spanner sections 14 and 14' may be made to incline upwardly from the medial collapsing scores 32 and 32', and the top edges 56 and 56' of the end panel sections 4 and 4' may also be correspondingly inclined.

In assembling the bottle carrier from the blank shown in Fig. 10, areas of adhesive $a$ and $a'$ are applied to the inside faces of the spanner sections 11 and 11' and corresponding areas of adhesive $b$ and $b'$ are applied to the inside faces of the spanner sections 14 and 14'. Areas of adhesive $c$ and $c'$ are also applied to the inside faces of the center flap sections 6 and 6'. As a modification, an area of adhesive $g$ may also be applied at this stage to the inside face of the lower extension 17 of the handle section 15 and that portion of the handle section 15 which is to overlap the inside face of the center partition section 5 when folded thereover.

In the first folding operation, the handle forming flap 13 is folded along the longitudinal score 37 to place the lower extension 17 and a substantial portion of the panel forming section 15 in overlying and glued relation to the inside face of the center partition section 5, with the hand hole 19 in the handle flap 13 aligning with the hand hole 55 in the center partition section 5 as shown in Fig. 11.

As the blank as shown in Fig. 11 continues to move through the gluing and folding machine, the left hand wings of the blank are folded along the aligned scores 23 and 23' so as to place the end panel sections 3 and 3' in overlying relation to the adjacent side panels 2 and 2', and to place the center partition sections 5 and 5' in overlying relation to the inside faces of adjacent side panels 2 and 2' and the inside faces of the adjacent end panel sections 4 and 4', as shown in Figs. 12 and 13.

The gluing and folding machine is at this point provided with buckling devices operating in conjunction with the above described folding movement of the end panel sections 3 and 3', which operates to fold the strap sections 9 and 9' along the transverse scores 29 and 29' into overlying relation to the adjacent medial extensions 12 and 12' of the side panels, and to additionally fold the associated spanner sections 11 and 11' outwardly along the transverse scores 31 and 31' into overlying relation to the associated infolded strap sections 9 and 9', as shown in dot and dash lines in Fig. 13. When this folding operation has been completed as shown in Fig. 12 and in full lines in Fig. 13, the spanner sections 11 and 11' will have become adhesively secured to the adjacent side edge faces of the center partition sections 5 and 5' respectively, and the opposite side edges of the center partition sections 5 and 5' will have become adhesively secured to the spanner sections 14 and 14' associated with the right hand wings $w$ and $w'$ on the blank.

In an associated folding operation, the center flap sections 6 and 6' are folded along the aligned scores 26 and 26' to overlie and become adhesively secured to the adjacent side edges of the center partition sections 5 and 5' as shown in Fig. 12. An area of adhesive $e$ is then applied to the entire face of the center partition section 5, an area of adhesive $e'$ is applied to the adjacent center flap section 6, and an area of adhesive $f$ is applied to the extended handle section 15' as shown in Fig. 12, care being taken to apply no adhesive to the underlying side panel 2.

In the next folding operation, the bottom panel is folded along its medial score 21 so as to place the bottom panel section 1' in overlying relation to the bottom section 1, to place the end panel section 3' in overlying but unglued relation to the end panel section 3, to place the inturned flap section 6' in overlying and glued relation to the inturned center flap section 6, and to place the center partition section 5' in overlying and glued relation to the center partition 5, without securement to the underlying side panel 2. When the blank shown in Fig. 12 is thus folded, the collapsed carrier will have been assembled to the form shown in Fig. 14.

As the final folding operation, the handle forming section 15' is folded along the medial score 33 over the upper horizontal edges 53 and 53' of the paired center partition sections 5 and 5', so as to overlie and become adhesively secured to the handle forming extension 51' of the center partition section 5'. When the partially assembled carrier as shown in Fig. 14 has thus been finally folded, the fully assembled and collapsed carrier as shown in Fig. 15 will have been produced.

To erect the fully assembled but collapsed carrier as shown in Fig. 15, the bottom panel at the collapsing score 21 is placed on a flat surface and downward pressure exerted thereon, thereby causing the carrier to become partially expanded into the form shown in Fig. 16. Complete expansion and erection of the carrier may be accomplished by shifting the center partition sections 5 and 5' to the left as shown in Fig. 16, providing the fully erected carrier in the form shown in Figs. 17, 18 and 19. To maintain the carrier in fully erected form during the bottle filling, the foot lug 45 associated with the bottom edge of the center partition section 5' may be inserted into the cut 21' formed centrally in the medial bottom collapsing score 21.

Bottle carriers made in accordance with this invention present a composite center partition of double ply construction and a strong and sturdy handle part which may be made from two to four plys of the sheet material. The carrier as shown in Figs. 8 and 9 made from the blank shown in Fig. 1, has a three ply handle construction, formed by the handle forming extension 49 of the center partition section 5 which is glued to and sandwiched between the handle forming sections 15 and 15' of the handle forming flap 13, with the lower extension 17 of the handle forming flap integrally joined to the center partition section 5 along the longitudinal score 37. The center partition sections 5 and 5' are also foldably connected to the end panel sections 3 and 3' over the full length thereof, and is foldably connected to the end panel sections 4 and 4′ over the full length thereof by the center flap sections 6 and 6′, thereby providing additional reinforcing for the composite, weight supporting center partition.

The assembled carrier shown in Figs. 16 to 19 inclusive and formed from the blank shown in Fig. 10, may have a four ply handle part formed by the handle forming extensions 51 and 51′ of the center partition sections 5 and 5′, with the handle forming section 15 of the handle flap 13 foldably connected and glued to the outside face of the center partition extension 51, and with the handle forming section 15′ overlapped and adhesively secured to the outside face of the center partition extension 51; the hand holes 55, 55′, 19 and 19′ falling into aligned registry.

By sacrificing some strength to the advantage of some paperboard saving, the center partition section 5′ as shown in Fig. 10 may be eliminated and in substitution thereof, a center flap section conforming to center flap section 6′ would be foldably connected along the folding score 25′ to the adjacent end panel section 3′ and spanner section 11′. In such modification, the handle part would be of three ply construction, formed by the handle forming extension 51 of the center partition section 5, the handle forming section 15 overlapped and glued to one face of the handle forming extension 51, and the other handle forming section 15′ overlapped and glued to the opposite face of the handle forming extension 51.

Also, it is within the purview of this invention to make the center flap section 6 of a size and shape to conform with the center partition section 5, without requiring change in the folding operations as above described, eliminating the center partition section 5′, and substituting therefore a narrow center flap section conforming to center flap section 6′.

In the blank forms shown in Figs. 10 and 11, it will be noted that the handle forming flap 13 is folded along longitudinal score 37 before the left hand wing extensions are folded along the aligned scores 23 and 23′ as shown in Fig. 12. It will be appreciated that the handle forming flap 13 of the blank shown in Fig. 1 may also be likewise folded, if desired, preliminary to folding the left wing extensions to overlie the adjacent side panels 2 and 2′, thereby making the sequence of folding operations for the blank shown in Fig. 1 similar to the sequence of folding operations employed in connection with the blank shown in Fig. 10.

Carriers constructed in accordance with this invention are balanced and symmetrical in appearance, and can be made in numerous attractive forms and patterns. These carriers are made to present substantial flat surfaces for advertising decoration, with the finished and decorated side of the blank forming the outer surfaces of the erected carrier, so that only one side thereof need be printed and decorated.

While certain novel features of this invention have been disclosed herein and are pointed out in the claims, it will be understood that various omissions, substitutions, and changes may be made by those skilled in the art without departing from the spirit of this invention.

What is claimed is:

1. A collapsible twin compartment article carrier formed from a single blank of sheet material having a bottom panel formed by a pair of foldably connected bottom sections, a pair of side panels foldably connected to the opposite side edges of the bottom panel, a pair of end panel sections at each end of the carrier foldably connected to the adjacent side edges of the side panels, a pair of center partition sections extending longitudinally of the carrier for substantially the full length thereof and foldably connected to the paired end panel sections at each end of the carrier dividing said carrier into two compartments, one of said center partition sections having its lower edge extending substantially down to the bottom panel of the erected carrier for substantially the full length thereof, said other partition section having a pair of spaced end leg portions whose lower ends extend substantially down to the bottom panel of the erected carrier and an intermediate portion having its lower edge terminating between the lower ends of said leg portions and the upper end of its center partition section, and an upturned handle panel having a foot extension integrally hinged to the lower edge of said intermediate portion and separated from said leg portions, and a handle portion with a hand hole therein projecting above the side panels of the carrier and extending substantially the full length thereof.

2. A collapsible twin compartment article carrier formed from a single blank of sheet material having a bottom panel formed by a pair of foldably connected bottom sections, a pair of side panels foldably connected to the opposite side edges of the bottom panel, a pair of end panel sections at each end of the carrier foldably connected to the adjacent side edges of the side panels, a pair of center partition sections extending longitudinally of the carrier for substantially the full length thereof and foldably connected to the paired end panel sections at each end of the carrier dividing said carrier into two compartments, one of said center partition sections having its lower edge extending substantially down to the bottom panel of the erected carrier for substantially the full length thereof, said other partition section having a pair of spaced end leg portions whose lower ends extend substantially down to the bottom panel of the erected carrier and an intermediate portion having its lower edge terminating between the lower ends of said leg portions and the upper end of its center partition section, an upturned handle panel having a foot extension integrally hinged to the lower edge of said intermediate portion and separated from said leg portions, and a handle portion with a hand hole therein projecting above the side panels of the carrier, and extending substantially the full length thereof, and a downfolded handle facing flap having a hand hole therein integrally hinged to the upper longitudinal edge of said upturned handle panel and secured to the outside face of one of said center partition sections.

3. A multi-cell twin compartment article carrier formed from a single blank of sheet material having a bottom panel formed by a pair of foldably connected bottom sections, pair of side panels foldably connectd to the opposite side edges of the bottom panel, a pair of end panel sections at each end of the carrier foldably connected to the adjacent side edges of the side panels, a pair of center partition sections extending longitudinally of the carrier for substantially the full length thereof and foldably connected to the paired end panel sections at each end of the carrier dividing said carrier into two similar compartments, one of said center partition sections having its lower edge extending substantially down to the bottom panel of the erected carrier for substantially the full length thereof, said other partition section having a pair of spaced end leg portions whose lower ends extend substantially down to the bottom panel of the erected carrier and an intermediate portion having its lower edge terminating between the lower ends of said leg portions and the upper end of its center partition section, and upturned handle panel having a foot extension integrally hinged to the lower edge of said intermediate portion and separated from said leg portions, and a handle portion with a hand hole therein projecting above the side panels of the carrier and extending substantially the full length thereof, and cell forming cross partitions for each of said compartments foldably connected at one end thereof to the adjacent center partition section and at the other end thereof to the adjacent side panel.

4. A multi-cell twin compartment article carrier formed from a single blank of sheet material having a bottom panel formed by a pair of foldably connected bottom sections, a pair of side panels foldably connected to the opposite side edges of the bottom panel, a pair of end panel sections at each end of the carrier foldably connected to the adjacent side edges of the side panels, a pair of center partition sections extending longitudinally of the carrier for substantially the full length thereof and foldably connected to the paired end panel sections at each end of the carrier dividing said carrier into two similar compartments, one of said center partition sections having its lower edge extending substantially down to the bottom panel of the erected carrier for substantially the full length thereof, said other partition section having a pair of spaced end leg portions whose lower ends extend substantially down to the bottom panel of the erected carrier and an intermediate portion having its lower edge terminating between the lower ends of said leg portions and the upper end of its center partition section, an upturned handle panel having a foot extension integrally hinged to the lower edge of said intermediate portion and separated from said leg portions, and a handle portion with a hand hole therein projecting above the side panels of the carrier and extending substantially the full length thereof, a downfolded handle facing flap having a hand hole therein integrally hinged to the upper longitudinal edge of said upturned handle panel and secured to the outside face of one of said center partition sections, and cell forming cross partitions for each of said compartments foldably connected at one end thereof to the adjacent center partition section and at the other end thereof to the adjacent side panel.

5. A collapsible twin compartment article carrier formed from a single blank of sheet material having a bottom panel formed by a pair of foldably connected bottom sections, a pair of side panels foldably connected to the opposite side edges of the bottom panel, a pair of end panel sections at each end of the carrier foldably connected to the adjacent side edges of the side panels, a pair of center partition sections extending longitudinally of the carrier for substantially the full length thereof and foldably connected to the paired end panel sections at each end of the carrier dividing said carrier into two compartments, said paired center partition sections having handle portions with aligned hand holes therein extending upwardly above said side panels, one of said center partition sections having its lower edge extending substantially down to the bottom panel of the erected carrier for substantially the full length thereof, said other partition section having a pair of spaced end leg portions whose lower ends extend substantially down to the bottom panel of the erected carrier and an intermediate portion having its lower edge terminating between the lower ends of said leg portions and the upper end of its center partition section, and an upturned handle panel having a foot extension integrally hinged to the lower edge of said intermediate portion and separated from said leg portions, and a handle portion projecting above the side panels of the carrier and extending substantially the full length thereof and having a hand hole therein aligned with the hand holes in the handle portions of said paired center partition sections.

6. A collapsible twin compartment article carrier formed from a single blank of sheet material having a bottom panel formed by a pair of foldably connected bottom sections, a pair of side panels foldably connected to the opposite side edges of the bottom panel, a pair of end panel sections at each end of the carrier foldably connected to the adjacent side edges of the side panels, a pair of center partition sections extending longitudinally of the carrier for substantially the full length thereof and foldably connected to the paired end panel sections at each end of the carrier dividing said carrier into two compartments, said paired center partition sections each having handle portions with aligned hand holes therein extending upwardly above said side panels, one of said center partition sections having its lower edge extending substantially down to the bottom panel of the erected carrier for substantially the full length thereof, said other partition section having a pair of spaced end leg portions whose lower ends extend substantially down to the bottom panel of the erected carrier and an intermediate portion having its lower edge terminating between the lower ends of said leg portions and the upper end of its center partition section, an upturned handle panel having a foot extension integrally hinged to the lower edge of said intermediate portion and separated from said leg portions and a handle portion projecting above the side panels of the carrier and extending substantially the full length thereof and having a hand hole therein aligned with the hand holes in the handle portions of said paired center partition sections, and a downfolded handle facing flap having a hand hole therein in alignment with the hand hole in said handle panel and integrally hinged to the upper longitudinal edge of said upturned handle panel and secured to the outside face of one of said center partition sections.

7. A multi-cell twin compartment article carrier formed from a single blank of sheet material having a bottom panel formed by a pair of foldably connected bottom sections, a pair of side panels foldably connected to the opposite side edges of the bottom panel, a pair of end panel sections at each end of the carrier foldably connected to the adjacent side edges of the side panels, a pair of center partition sections extending longitudinally of the carrier for substantially the full length thereof and foldably connected to the paired end panel sections at each end of the carrier dividing said carrier into two compartments, said paired center partition sections each having handle portions with aligned hand holes therein extending upwardly above said side panels, one of said center partition sections having its lower edge extending substantially down to the bottom panel of the erected carrier for substantially the full length thereof, said other partition section having a pair of spaced end leg portions whose lower ends extend substantially down to the bottom panel of the erected carrier and an intermediate portion having its lower edge terminating between the lower ends of said leg portions and the upper end of its center partition section, an upturned handle panel having a foot extension integrally hinged to the lower edge of said intermediate portion and separated from said leg portions and a handle portion projecting above the side panels of the carrier and extending substantially the full length thereof and having a hand hole therein aligned with the hand holes in the handle portions of said paired center partition sections, and cell defining cross partitions for each of said compartments foldably connected at one end thereof to the adjacent center partition section and at the other end thereof to the adjacent side panel.

8. A multi-cell twin compartment article carrier formed from a single blank of sheet material having a bottom panel formed by a pair of foldably connected bottom sections, a pair of side panels foldably connected to the opposite side edges of the bottom panel, a pair of end panel sections at each end of the carrier foldably connected to the adjacent side edges of the side panels, a pair of center partition sections extending longitudinally of the carrier for substantially the full length thereof and foldably connected to the paired end panel sections at each end of the carrier dividing said carrier into two compartments, said paired center partition sections having handle portions with aligned hand holes therein extending upwardly above said side panels, one of said center partition sections having its lower edge extending substantially down to the bottom panel of the erected carrier for substantially the full length thereof, said other partition section having a pair of spaced end leg portions whose lower ends extend substantially down to the bottom panel of the erected carrier and an intermediate portion having its lower edge terminating between the lower ends of said leg portions and the upper end of its center partition section, an upturned handle panel having a foot extension integrally hinged to the lower edge of said intermediate portion and separated from said leg portions, and a handle portion projecting above the side panels of the carrier and extending substantially the full length thereof and having a hand hole therein aligned with the hand holes in the handle portions of said paired center partition sections, a downfolded handle facing flap having a hand hole therein in alignment with the hand hole in said handle panel and integrally hinged to the upper longitudinal edge of said upturned handle panel and secured to the outside face of one of said center partition sections, and cell defining cross partitions for each of said compartments foldably connected at one end thereof to the adjacent center partition section and at the other end thereof to the adjacent side panel.

9. A one-piece blank designed to form a twin compartment article carrier having a bottom panel presenting a pair of foldably connected bottom panel half-sections, a pair of side panels foldably connected to the opposite side edges of said bottom panel, a first pair of wing extensions projecting laterally from adjacent side edges of both side panels and presenting free lower edges, said first pair of wing extensions including a pair of end panel half-sections foldably connected to the adjacent side edges of the side panels and a pair of center partition securing flaps foldably connected to said end panel sections, a second pair of wing extensions integrally hinged to the adjacent opposite side edges of the side panels, said second pair of wing extensions including a pair of end panel half-sections integrally hinged to the side panels and a pair of center partition sections integrally hinged to the adjacent end panel sections and designed to be connected to the opposite center partition securing flaps when the carrier is assembled, said center partition sections having a length substantially equal to the length of said side panels, one of said center partition sections having a pair of spaced end leg portions whose lower ends are substantially in alignment with the lower edge of the adjacent side panel and an intermediate portion having its lower edge terminating between the lower ends of said leg portions and the upper end of its center partition section, said other partition section having its lower edge substantially in alignment with the lower edge of the adjacent side panel for substantially the full length thereof, a handle forming panel captured from material between said second pair of adjacent wing extensions having a foot extension integrally hinged along a longitudinal score to the lower edge of said intermediate portion and separated from said leg portions of said first named center partition section and having the other end thereof connected by a breakable neck portion to the lower edge of the other center partition section, said handle panel having its leg extension designed to be folded in superimposed relation over the center partition section to which it is hinged and a handle forming portion whose length is substantially equal to the length of the adjacent side panel and having a hand hole therein designed to extend above the top edge of the adjacent side panel when the carrier is assembled, said handle forming panel including a handle facing flap integrally hinged along a longitudinal score to the handle forming portion thereof, said handle facing flap having a hand hole therein designed to be downfolded when the carrier is assembled with the hand hole therein in registry with the hand hole in said handle forming portion and with the lower edge of the handle facing flap terminating not appreciably below the plane of the top edge of the adjacent side panel.

10. A one-piece blank designed to form a six-cell twin compartment article carrier having a bottom panel presenting a pair of foldably connected bottom panel half-sections, a pair of side panels foldably connected to the opposite side edges of said bottom panel, each of said side panels having a raised extension medially thereof, a first pair of wing extensions projecting laterally from adjacent side edges of both side panels and presenting free lower edges, said first pair of wing extensions including a pair of end panel half-sections foldably connected to the adjacent side edges of the side panels and a pair of center partition securing flaps foldably connected to said end panel sections, a second pair of wing extensions integrally hinged to the adjacent opposite side edges of the side panels, said second pair of wing extensions including a pair of end panel half-sections integrally hinged to the side panels and a pair of center partition sections integrally hinged to the adjacent end panel sections and designed to be connected to the opposite center partition securing flaps when the carrier is assembled, a pair of partition forming straps integrally hinged to the opposite side edges of each of said medial extensions but otherwise separated from the adjacent side panel and the adjacent end panel sections, said center partition sections having a length substantially equal to the length of said side panels, one of said center partition sections having a pair of spaced end leg portions whose lower ends are substantially in alignment with the lower edge of the adjacent side panel and an intermediate portion having its lower edge terminating between the lower ends of said leg portions and the upper end of its center partition section, said other partition section having its lower edge substantially in alignment with the lower edge of the adjacent side panel for substantially the full length thereof, a handle forming panel captured from material between said second pair of adjacent wing extensions having a foot extension integrally hinged along a longitudinal score to the lower edge of said intermediate portion and separated from said leg portions of said first named center partition section and having the other end thereof connected by a breakable neck portion to the lower edge of the other center partition section, said handle forming panel having its leg extension designed to be folded in superimposed relation over the center partition section to which it is hinged and a handle forming portion whose length is substantially equal to the length of the adjacent side panel and having a hand hole therein designed to extend above the top edge of the adjacent side panel when the carrier is assembled, said handle forming panel including a handle facing flap integrally hinged along a longitudinal score to the handle forming portion thereof, said handle facing flap having a hand hole therein designed to be downfolded when the carrier is assembled with the hand hole therein in registry with the hand hole in said handle forming portion and with the lower edge of the handle facing flap terminating not appreciably below the plane of the top edges of the adjacent partition forming straps.

11. A one-piece blank designed to form a twin compartment article carrier having a bottom panel presenting a pair of foldably connected bottom panel half-sections, a pair of side panels foldably connected to the opposite side edges of said bottom panel, a first pair of wing extensions projecting laterally from adjacent side edges of both side panels and presenting free lower edges, said first pair of wing extensions including a pair of end panel half-sections foldably connected to the adjacent side edges of the side panels and a pair of center partition securing flaps foldably connected to said end panel sections, a second pair of wing extensions integrally hinged to the adjacent opposite side edes of the side panels, said second pair of wing extensions including a second pair of end panel half-sections integrally hinged to the side panels and a pair of center partition sections integrally hinged to the adjacent end panel sections and designed to be connected to the opposite center partition securing flaps when the carrier is assembled, each of said paired center partition sections presenting handle portions having hand holes therein projecting beyond the top edge of the adjacent side panel said center partition sections having a length substantially equal to the length of said side panels, one of said center partition sections having a pair of spaced end leg portions whose lower ends are substantially in alignment with the lower edge of the adjacent side panel and an intermediate portion having its lower edge terminating between the lower ends of said leg portions and the upper end of its center partition section, said other partition section having its lower edge substantially in alignment with the lower edge of the adjacent side panel for substantially the full length thereof, a handle forming panel captured from material between said second pair of adjacent wing extensions having a foot extension integrally hinged along a longitudinal score to the lower edge of said intermediate portion and separated from said leg portions of said first named center partition section and having the other end thereof connected by a breakable neck portion to the lower edge of the other center partition section, said handle panel having its foot extension designed to be folded when the carrier is assembled into superimposed relation over the center partition section to which it is hinged and a handle forming portion having a length substantially equal to the length of the adjacent side panel and having a hand hole therein designed to register with the hand holes in the handle portions of said center partition sections, said center partition panel including a handle facing flap integrally hinged along a longitudinal score to the center partition portion thereof, said handle facing flap having a hand hole therein designed to be downfolded when the carrier is assembled with the hand hole therein in registry with the hand holes in said center partition sections and with the lower edge of said handle facing flap terminating not appreciably below the plane of the top edge of the adjacent side panel.

12. A one-piece blank designed to form a six cell twin compartment article carrier having a bottom panel presenting a pair of foldably connected bottom panel half-sections, a pair of side panels foldably connected to the opposite side edges of said bottom panel, each of said side panels having a raised extension medially thereof, a first pair of wing extensions projecting laterally from adjacent side edges of both side panels and presenting free lower edges, said first pair of wing extensions including a pair of end panel half-sections foldably connected to the adjacent side edges of the side panels and a pair of center partition securing flaps foldably connected to said panel sections, a second pair of wing extensions integrally hinged to the adjacent opposite side edges of the side panels, said second pair of wing extensions including a second pair of end panel half-sections integrally hinged to the side panels and a pair of center partition sections integrally hinged to the adjacent end panel sections and designed to be connected to the opposite center partition securing flaps when the carrier is assembled, said center partition sections having a length substantially equal to the length of said side panels, one of said center partition sections having a pair of spaced end leg portions whose lower ends are substantially in alignment with the lower edge of the adjacent side panel and an intermediate portion having its lower edge terminating between the lower ends of said leg portions and the upper end of its center partition section, said other partition section having its lower edge substantially in alignment with the lower edge of the adjacent side panel for substantially the full length thereof, each of said paired center partition sections presenting handle portions having hand holes therein projecting beyond the top edge of the adjacent side panel, a pair of partition forming straps integrally hinged to the opposite side edges of each of said medial extensions but otherwise separated for the adjacent side panel and the adjacent end panel sections, a handle forming panel captured from material between said second pair of adjacent wing extensions having a foot extension integrally hinged along a longitudinal score to the lower edge of said intermediate portion and separated from said leg portions of said first named center partition section and having the other end thereof connected by a breakable neck portion to the lower edge of the other center partition section, said handle panel having its foot extension designed to be folded when the carrier is assembled into superimposed relation over the center partition section to which it is hinged and a handle forming portion having a length substantially equal to the length of the adjacent side panel and having a hand hole therein designed to register with the hand holes in the handle portions of said center partition sections, said center partition panel including a handle facing flap integrally hinged along a longitudinal score to the center partition portion thereof, said handle facing flap having a hand hole therein designed to be downfolded when the carrier is assembled with the hand hole therein in registry with the hand holes in said center partition sections and with the lower edge of said handle facing flap terminating not appreciably below the plane of the top edge of the adjacent partition forming straps.

References Cited in the file of this patent
UNITED STATES PATENTS

| | | |
|---|---|---|
| 2,395,711 | Arnold | Feb. 26, 1946 |
| 2,535,741 | Lighter | Dec. 26, 1950 |
| 2,537,452 | Forrer | Jan. 9, 1951 |
| 2,537,615 | Arneson | Jan. 9, 1951 |
| 2,593,135 | Gilbert | Apr. 15, 1952 |
| 2,594,377 | Arneson | Apr. 29, 1952 |
| 2,606,711 | Forrer | Aug. 12, 1952 |
| 2,606,712 | Kowal | Aug. 12, 1952 |
| 2,609,137 | Toensmeier | Sept. 2, 1952 |
| 2,634,043 | Arneson | Apr. 7, 1953 |
| 2,637,480 | Forrer | May 5, 1953 |
| 2,686,003 | Forrer | Aug. 10, 1954 |